United States Patent
Kuspa (10) Patent No.: US 9,817,829 B2
(45) Date of Patent: Nov. 14, 2017

(54) SYSTEMS AND METHODS FOR PRIORITIZING TEXTUAL METADATA

(75) Inventor: David Kuspa, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1351 days.

(21) Appl. No.: 12/259,557

(22) Filed: Oct. 28, 2008

(65) Prior Publication Data

US 2014/0250056 A1 Sep. 4, 2014

(51) Int. Cl.
*G06F 17/30* (2006.01)
*G06F 7/00* (2006.01)

(52) U.S. Cl.
CPC .............. *G06F 17/30038* (2013.01)

(58) Field of Classification Search
CPC .............. G06F 11/1435; G06F 17/301; G06F 17/30525; G06F 17/30997; G06F 17/30038
USPC ......................... 707/758, 769, 603
See application file for complete search history.

(56) References Cited

U.S. PATENT DOCUMENTS

| | | | |
|---|---|---|---|
| 5,649,060 A | 7/1997 | Ellozy et al. | |
| 5,794,249 A | 8/1998 | Orsolini et al. | |
| 6,363,429 B1* | 3/2002 | Ketcham | 709/235 |
| 7,231,351 B1 | 6/2007 | Griggs | |
| 7,337,462 B2* | 2/2008 | Dudkiewicz et al. | 725/136 |
| 7,995,440 B2* | 8/2011 | Murakoshi | 369/53.41 |
| 8,385,588 B2* | 2/2013 | Jacoby et al. | 382/100 |
| 2002/0010916 A1* | 1/2002 | Thong et al. | 725/1 |
| 2003/0093260 A1* | 5/2003 | Dagtas | G06F 17/30746 704/1 |
| 2003/0093790 A1* | 5/2003 | Logan et al. | 725/38 |
| 2003/0164924 A1* | 9/2003 | Sherman et al. | 352/6 |
| 2006/0074895 A1* | 4/2006 | Belknap | G06F 17/3074 |
| 2007/0233738 A1* | 10/2007 | Weinberger et al. | 707/104.1 |
| 2007/0297757 A1* | 12/2007 | Kauffman et al. | 386/55 |
| 2008/0046406 A1* | 2/2008 | Seide et al. | 707/3 |
| 2008/0092168 A1* | 4/2008 | Logan et al. | 725/44 |
| 2008/0281599 A1* | 11/2008 | Rocca | G06F 17/30017 704/270 |
| 2009/0087161 A1* | 4/2009 | Roberts et al. | 386/66 |
| 2009/0154890 A1* | 6/2009 | Nakamura | G06F 17/30029 386/240 |

(Continued)

OTHER PUBLICATIONS

Adobe Systems Inc., "Using Adobe Premiere Pro C54," 2008, San Jose, CA (available at http://www.adobe.com/support/premiere) (last accessed Oct. 27, 2008).

*Primary Examiner* — Kuen Lu
(74) *Attorney, Agent, or Firm* — Kilpatrick Townsend & Stockton LLP (57) ABSTRACT

A priority for one or more source components can be determined for use in providing metadata for a composite media presentation. For example, an audio component containing or associated with a text transcript may be prioritized based on a gain value, gain differential, and/or frequency range associated with the audio component, with data indicating the priority stored in a computer-readable medium. When transcript or other metadata is provided for the composite media presentation, the priority information can be used to select how (or whether) data or metadata associated with each component will be used in providing transcript metadata for the presentation as a whole.

17 Claims, 7 Drawing Sheets

(56) References Cited

U.S. PATENT DOCUMENTS

| | | | |
|---|---|---|---|
| 2009/0177965 A1* | 7/2009 | Peralta | G06F 9/4443 715/716 |
| 2009/0215418 A1* | 8/2009 | Thomas et al. | 455/231 |
| 2009/0282013 A1* | 11/2009 | Joshi | G06F 17/30864 |
| 2010/0129052 A1* | 5/2010 | Fujinami | G11B 27/005 386/241 |
| 2011/0268189 A1* | 11/2011 | Haskell et al. | 375/240.15 |

\* cited by examiner

SYSTEMS AND METHODS FOR PRIORITIZING TEXTUAL METADATA

TECHNICAL FIELD

The disclosure below generally relates to handling metadata associated with media presentations.

BACKGROUND

Media presentations typically comprise data used to render one or more components of the presentation, such as the video and audio components of a multimedia clip. The presentation may be associated with additional data commonly referred to as metadata. Metadata may describe the data component(s) comprising the presentation and/or may provide information about the contents of the presentation.

For example, metadata may comprise text representing a transcript of an audio component of a presentation. The transcript may include text describing the contents of the audio component, such as words, music, and/or other sounds. When rendering a presentation, the metadata may be used in addition to the data comprising the presentation. Returning to the example of transcript metadata, the transcript may be used to render subtitles or closed-caption text as part of or alongside the media presentation; of course, the transcript could be provided separately for later review.

Media presentations can be created and/or edited using various types of authoring tools. One example of an authoring tool is ADOBE® PREMIERE PRO®, available from Adobe Systems Inc. of San Jose, Calif. Using an authoring tool, video, audio, and/or other components from different sources can be combined into a composite presentation. If desired, effects can be added. As one example, a group of video clips with associated audio can be combined into a composite presentation such as a newscast that features transitions between scenes, voice-overs, credits, and other effects that tie the components into a unified media product.

Multiple video or audio components are often stacked in layers on different tracks so that the components overlap the same time locations in the program to create composited effects, cutaways from the main subject, etc. These tracks may contain multiple audio clips that are mixed at different volumes so the audience (ideally) hears the intended primary audio track. For example, a documentary on education may contain a segment with a video clip of a classroom lecture with a professor talking to students while a narrator describes the class via a different audio track. At the same time, a music clip may also be playing that contains lyrics from a song. This segment is mixed so the narration can be clearly heard over the other audio elements playing at the same time.

Each of the separate audio clips may contain or may be associated with a text transcript of the spoken words recorded in that clip. However, if tracks including multiple audio components are included in the composite presentation at the same time, an automatically-generated transcript from all the tracks may be confusing or unusable due to the intermingled text.

SUMMARY

Certain embodiments of the present subject matter provide systems and methods that capture and use transcript metadata from components of composite media presentations. Certain embodiments use audio data of a composite presentation, which may comprise mixed audio data from multiple clips playing at the same time, as a source for speech-to-text conversion. Additionally or alternatively, transcript metadata of the clips may be used as a source for generating transcript metadata for the composite presentation.

In certain embodiments of the present subject matter, a priority for one or more source components can be determined for use in providing metadata for a composite media presentation. For example, an audio component may be prioritized based on a gain value or gain differential associated with the audio component, with data indicating the priority stored in a computer-readable medium. When transcript or other metadata is provided for the composite media presentation, the priority information can be used to select how (or whether) data or metadata associated with each component will be used.

For example, when providing transcript metadata for a composite media presentation based on text metadata associated with components in the composite media presentation, the text metadata associated with the component having the highest priority over a given time interval of the composite media presentation may be used as the source of the transcript metadata for that time interval. The priority can be determined based on evaluating the gain or gain differential of the audio, and as the gain value or differential changes, the source of transcript metadata for the composite media presentation can change.

The gain value may be evaluated in any number of ways, including by measuring the highest gain value over a defined period of time rather than any given instant. As another example, gain differential between two or more different audio tracks could be tracked over time. As yet another example, frequency analysis could be used to distinguish spoken words from white noise or other audio components, with the evaluated gain level (or differential) based on the spoken word component. As a further example, a gain value can be "weighted" by including a frequency measurement.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures, in which use of like reference numerals in different features is intended to illustrate like or analogous components.

DETAILED DESCRIPTION

Reference will now be made in detail to various and alternative exemplary embodiments and to the accompanying drawings, with like numerals representing substantially identical structural elements. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

A computer-implemented method for evaluating metadata in a composite media object can comprise identifying a presentation characteristic for a plurality of components that overlap during at least one time interval of a composite media object, determining a priority of each of the plurality of components for at least one time interval by comparing the identified presentation characteristic, and storing data indicating the priority of the plurality of components for the time interval(s) in a computer-readable medium.

For example, the composite media presentation may comprise a first component comprising a video clip with associated audio and a second component comprising audio voiceover. The presentation characteristic can comprise an audio gain level. The voiceover component may overlap with the video clip during all or part of the composite media presentation. The relative priority of the audio components can be determined and stored in one or more computer-readable media.

A priority of some or all of the plurality of components can be determined over a plurality of time intervals. Depending on the particular components, storing data indicating the priority of each of the plurality of components can comprise storing data indicating a change in priority for at least one component over time. The "highest priority" audio track is the audio track within a mixture of overlapping tracks that the program's creators intended the audience to focus on at any point in time. Focus, or the ability to hear the intended priority track, is typically ensured by making the volume of the highest priority track higher than the other tracks that are playing simultaneously.

Returning to the example above, during an initial time interval the gain level of audio associated with the second (voiceover) component may be at a higher level than the gain level of audio associated with the first (video) component. During a following time interval, the audio associated with the second (voiceover) component may be reduced and the gain level of the first (video) component increased. During the initial time interval, the second component may have a higher priority than the first component, while during the following time interval, the first component may have a higher priority than the second component.

In some embodiments, the method can comprise providing transcript metadata for a plurality of time intervals of the composite media object based on data indicating which component has the highest priority during each time interval. "Providing" transcript metadata can include generating a transcript and/or outputting data based on the transcript as part of the presentation (e.g. text data such as closed captioning or subtitles) or alongside the presentation (e.g. via another device providing output at the same time as the presentation). As another example, providing transcript metadata may comprise storing the transcript metadata along with other metadata for the composite media presentation for later use.

For instance, returning to the example above, during the initial time interval, the transcript may be provided based on data and/or metadata associated with the second component. During the following time interval, the transcript may be provided based on data and/or metadata associated with the first component.

In some embodiments, one or more components are each associated with respective transcript data and the transcript for each time interval of the composite media object is generated by accessing transcript data associated with the component having the highest priority during that time interval. In other embodiments, the transcript for each time interval can be generated based on audio data associated with the component having the highest priority during a time interval using speech-to-text techniques.

In some embodiments, the one of the plurality of components whose audio has the highest gain value during a particular segment is selected as a source for transcript metadata for that segment of the composite media presentation. However, in other embodiments, transcript metadata for the composite media presentation can be sourced from data and/or metadata associated with multiple components. In such cases, the resulting transcript metadata can include data indicating the gain value of the audio component (and/or another indicator of the priority of the component) from which the word was derived during the time interval of the composite media presentation at which the word appears.

For example, when transcript metadata contains text sourced from a plurality of overlapping audio components during the same interval, the words of the transcript may be annotated with an indication of priority such as a gain level. Thus, when the transcript metadata is accessed, the annotations can be a basis in determining how particular words will be used for output or other purposes.

Figure 1:
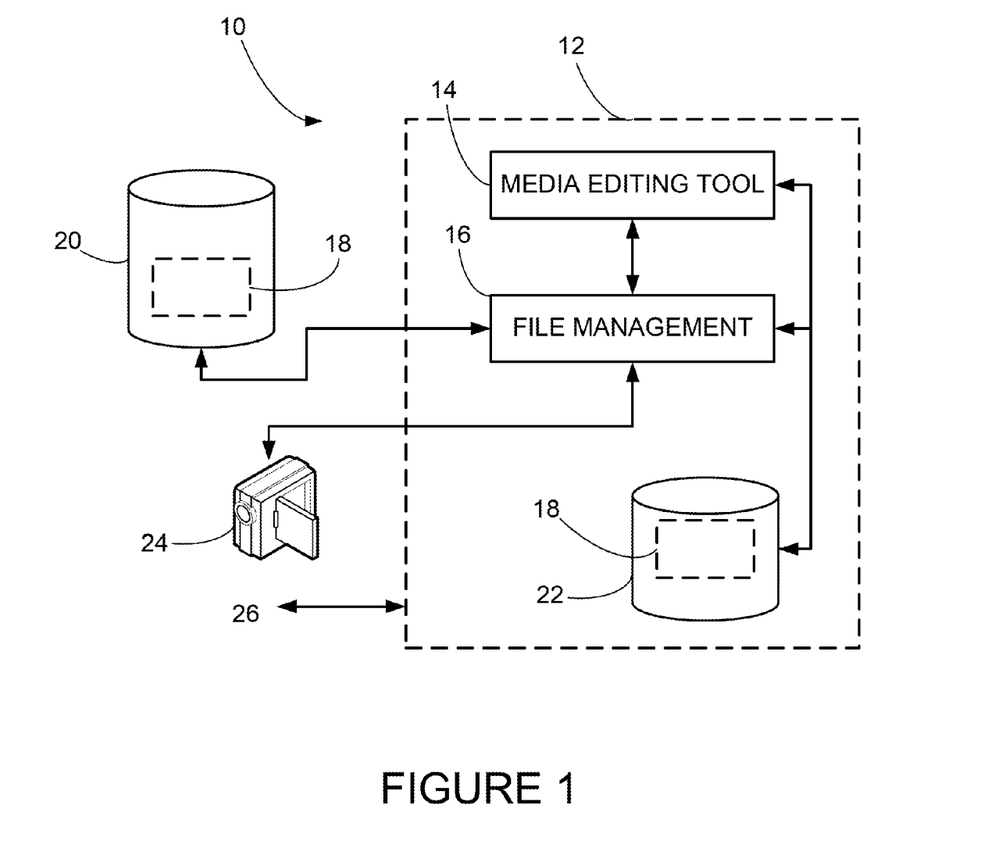
FIG. 1 is a block diagram showing an exemplary system in which a media presentation can be created, edited, and/or displayed.

Before addressing particular aspects of the present subject matter, a brief example of a suitable operating environment will be discussed. FIG. 1 is a block diagram showing an exemplary system 10 in which a media presentation can be created, edited, and/or displayed. In this example, a computing device 12 provides media editing tool 14 which may, for example, comprise a nonlinear or other editor configured in accordance with aspects of the present subject matter. Editing tool 14 and/or file management component 16 access component data 18, which represents data and/or metadata for components of a composite media presentation. In this example, media editing tool 14 and file management component 16 may access component data 18 maintained in a remote data store 20 and/or a local data store 22. In this example, file management component 16 can also import data from capture device 24, which may represent a digital or other video camera. User input/output 26 can represent commands provided by a user via keyboard, mouse, voice, or other input device. Any suitable output can be provided, including visual and audio feedback.

Figure 1A:
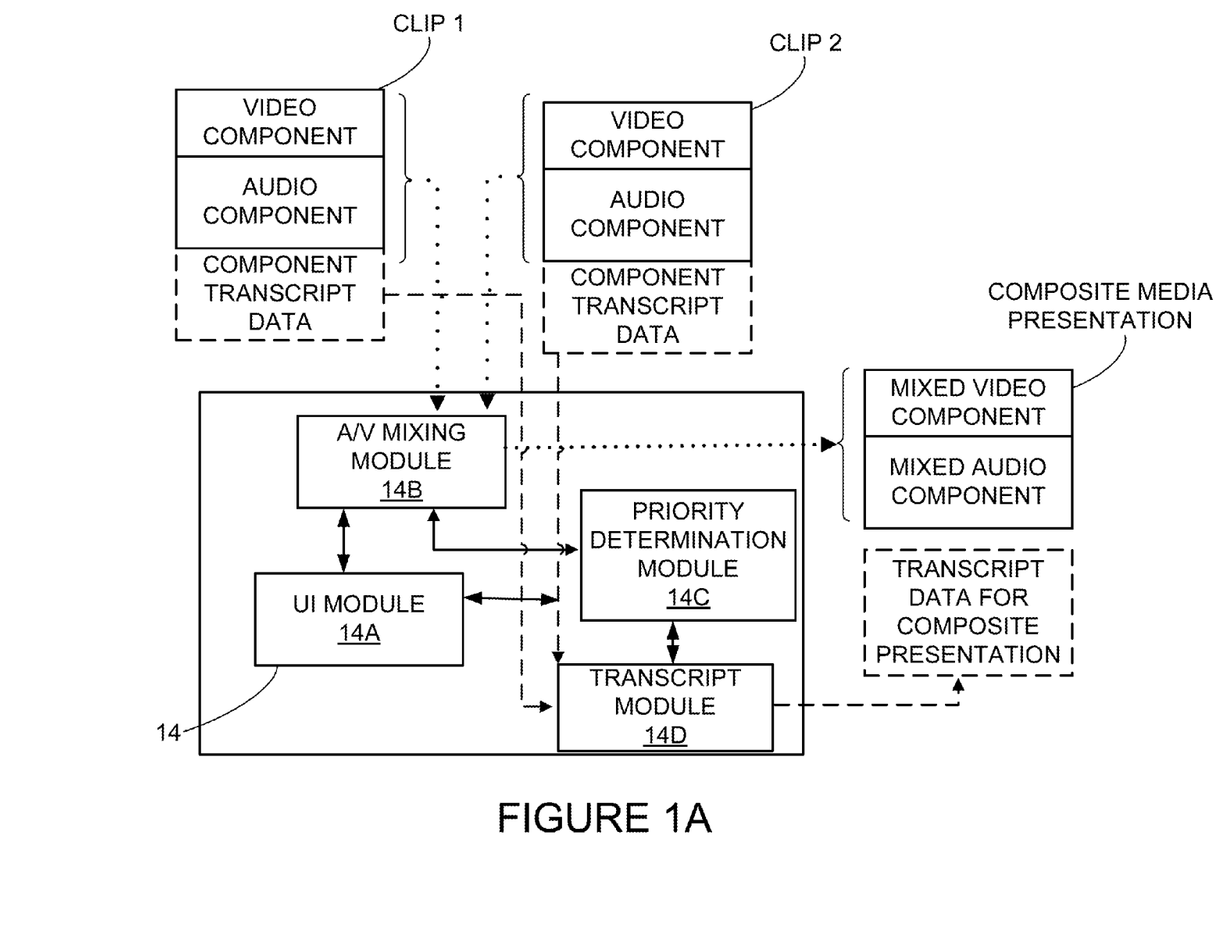
FIG. 1A is a block diagram showing an exemplary media presentation editing application.

FIG. 1A is a block diagram showing an exemplary media presentation editing tool. In this example, media editing tool 14 comprises a user interface (UI) module 14A, an audio-visual (A/V) mixing module 14B, and a priority determination module 14C. As shown, A/V mixing module 14B can be used to mix together multiple video, audio, or audiovisual components. In this example, two clips (Clip 1, Clip 2) are shown, with each clip comprising a video component, an audio component, and component transcript data. A/V mixing module can comprise conventional software or other processes for combining audio and video clips based on user commands provided via UI module 14A.

Priority determination module 14C is used to determine transcript data for the composite presentation based on component transcript data. Priority determination module 14C can do so based on user input provided via UI module 14A. Priority determination module 14C may further send data to and receive data from A/V mixing module regarding audio gain, frequency, and the like and/or may access audio components of clips directly for analysis purposes. Priority determination module 14C can prioritize clips based on audio gain, frequency, differential, or other suitable characteristics to determine which clip is the intended focus at a given point in a composite media presentation.

In this example, based on analysis from priority determination module 14C, transcript module 14D uses transcript data associated with the clips (as indicated by the dashed lines) when providing transcript data for the composite media presentation. In this example, transcript metadata is already associated with each clip. In some embodiments, transcript module 14D could provide a transcript for each clip using, for example, a speech-to-text engine and then provide the transcript for the composite media presentation by selecting transcript data associated with each clip based on priority data from module 14C. Transcript module 14D may additionally interface with UI module 14A to receive user preferences and settings regarding how transcript data is to be provided.

FIG. 1A is meant to provide a generalized example of constructing a media editing tool such as a software component, application, or suite. In practice, more or fewer modules could be used to implement media editing tool 14. Further, in some embodiments, "modules" per se are not required and another suitable architecture could be used.

Figure 2:
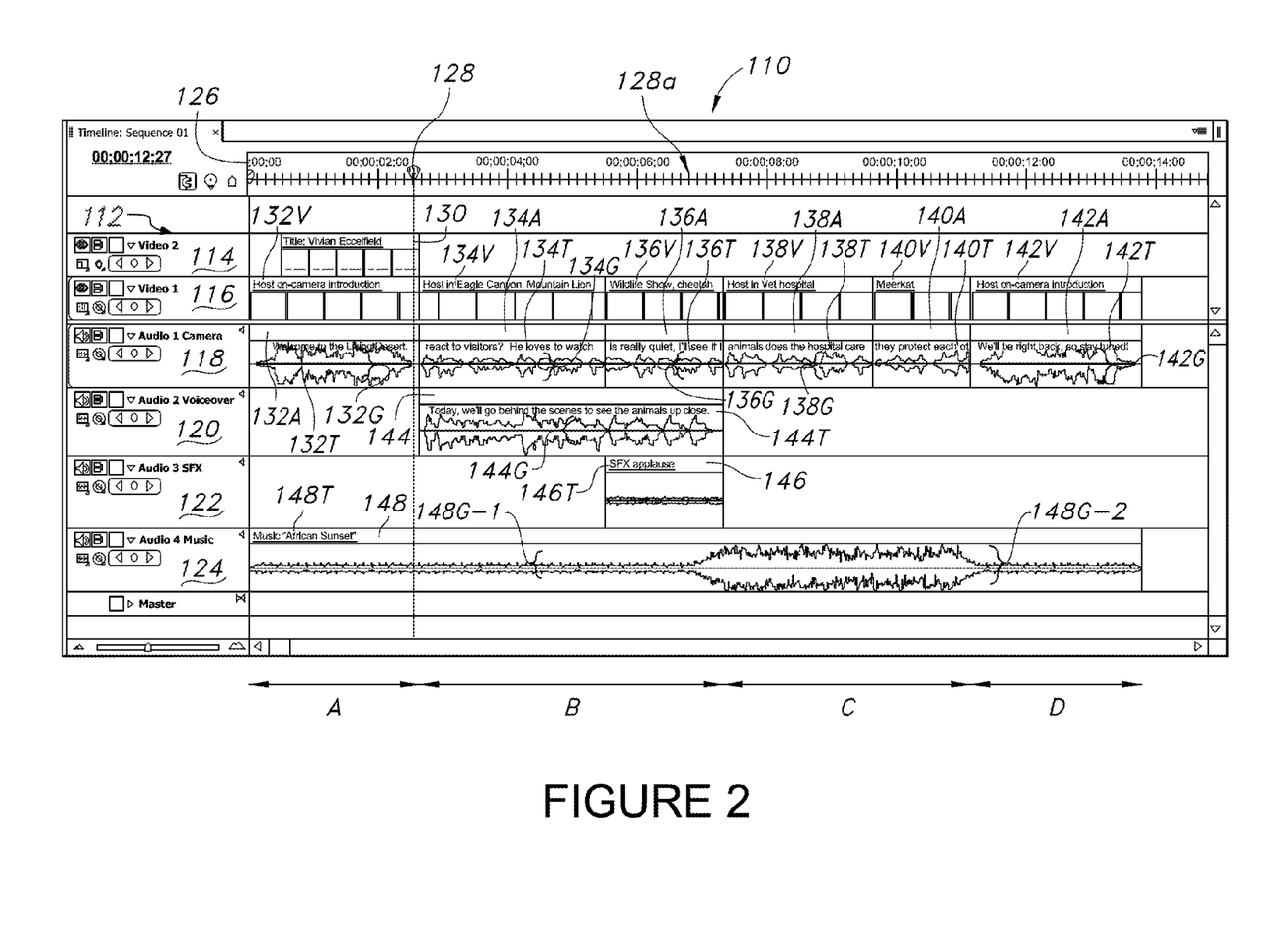
FIG. 2 is an example of an editing interface for a composite media presentation.

Generally speaking, a composite media presentation comprises a plurality of components that may overlap during at least part of the presentation. FIG. 2 illustrates an editing interface 110 which can be used to construct or edit a composite media presentation in a tool such as ADOBE® PREMIERE PRO®. Editing interface 110 is used to conceptually illustrate how the composite media presentation comprises a plurality of components 130, 132V, 132A, 134V, 134A, 136V, 136A, 138V, 138A, 140V, 140A, 142V, 144, 146, and 148. For example, editing interface 110 may be one manner by which user input is received and output is provided by media editing tool 14 of FIG. 1.

In this example, components 130-148 are arranged in a plurality of tracks 112, namely video tracks 114/116 and audio tracks 118, 120, 122, and 124. Each track represents a portion of the composite media presentation over time, with time indicated in timeline 126. It will be understood that although this example illustrates a composite media presentation by way of a particular editing interface, the present subject matter is applicable to composite media presentations without regard to how the presentations are assembled.

In this example, a "teaser" portion of a composite media presentation is illustrated. For instance, documentaries and other programs may include a brief preview or overview of content to follow. During the preview, credits for the presentation are provided along with brief clips of content to follow and a combination of narration and music.

Thus, video component 130 represents a title card including credits, a title for the composite media presentation, or other information. Video components 132V and 142V may represent a host speaking to the camera to introduce the program. Video components 134V, 136V, 138V, and 140V may each represent different video clips previewing later portions of the presentation. For example, video components 134V and 138V may represent an interview between a program host and an interviewee. Clips 136V and 140V may each represent other video segments, such as "b-roll" footage used during the introduction.

In some instances, video components may be handled as separate components from audio components. However, in some popular editing tools, video components are associated with one or more corresponding audio components and are handled as a single unit. This is illustrated in FIG. 1 by audio components 132A, 134A, 136A, 138A, 140A, and 142A. For instance, when this portion of the composite media presentation was assembled, video component 132V with associated audio component 132A was placed in time interval A; video component 134V with associated audio component 134A was placed at time interval B followed by video component 136V with associated audio component 136A; video component 138V with associated audio component 138A was placed at time interval C followed by video component 140V with associated audio component 140A; and video component 142V with associated audio component 142A was placed at time interval D.

Additional components were added in this example. For example audio component 144 may represent a voiceover recording describing later content of the composite media presentation. Audio component 146 represents an applause sound effect, while audio component 148 represents background music whose volume is increased during time interval C.

As part of the editing process, a user can provide various mix parameters controlling how components are to be output. After editing is complete, an end user may be provided output comprising a "mixed down" version of the composite media presentation in which the components are blended together based on the mix parameters set during editing. Put another way, in the mixed down version, the source, layout, and other parameters visible during editing are not explicitly provided to the audience.

It is important to note that the actual data content and structure of data or signals used to provide the mixed-down output can vary. For example, the mixed down output can be generated from a data structure that preserves the separate identities of the components and indicates their relative track location and other playback parameters. On the other hand, the mixed down output may be generated from a data structure that does not preserve the components as separate items, but instead comprises a single audiovisual media stream representing the end result of the playback parameters as applied to the components via the editing software. For example, the editing software may output a video file with associated audio in a suitable format as MPEG-2, MPEG-4, or the like. In either case, metadata for the composite media presentation as a whole may be embedded within or provided alongside the data defining the content of the composite media presentation.

Returning to FIG. 2, marker 128 represents a playback point at which title component 130 is overlain on video component 132V. Simultaneously, audio components 132A and 148 are output based on mix commands set during editing. For instance, video track 116 may correspond to a "primary" video source for the presentation, while video track 114 may correspond to an "effects" video source. By placing title component 130 in video track 114, title component 130 may be superimposed over video component 132A in the mixed-down version of the composite media presentation.

As time advances, different components placed in the tracks will appear in the mixed down version. For instance, marker 128A represents a later point in the composite media presentation at which components 136V, 136A, 144, 146, and 148 overlap. In the mixed-down version, video component 136V will be provided along with audio components 136A, 144, 146, and 148.

Mixed-down output will also depend on parameters that control how audio is to be presented. For example, during time intervals A and D, audio from track 118 (corresponding to audio components 132A and 142A) may be the intended focus for the audience (i.e. the highest-priority audio), while music from audio component 148 may be in a background role. Thus, a user can set a mix parameter, such as an audio gain value for track 118 and/or components 132A and 142A to be higher than the audio gain for track 124 and/or audio component 148.

In the example of FIG. 1, editing interface 110 renders a waveform representing the audio components. In some embodiments, a user may be able to click a waveform to adjust the gain level; other interfaces may support a slider, dial, numerical input, or other suitable input method. Depending on the editor and interface, audio gain may be set on a component-by-component or track-by-track basis. The present subject matter does not depend on the particular manner by which audio gain is set.

Example waveforms are indicated at 132G (corresponding to audio component 132A), 134G (corresponding to audio component 134A), 136G (corresponding to audio component 136A), 138G (corresponding to audio component 138A), 140G (corresponding to audio component 140A), 142G (corresponding to audio component 142A), 144G (corresponding to audio component 144), and at two points for audio component 148, a first point (148G-1) and a second point (148G-2) later in the presentation.

Figure 3A:
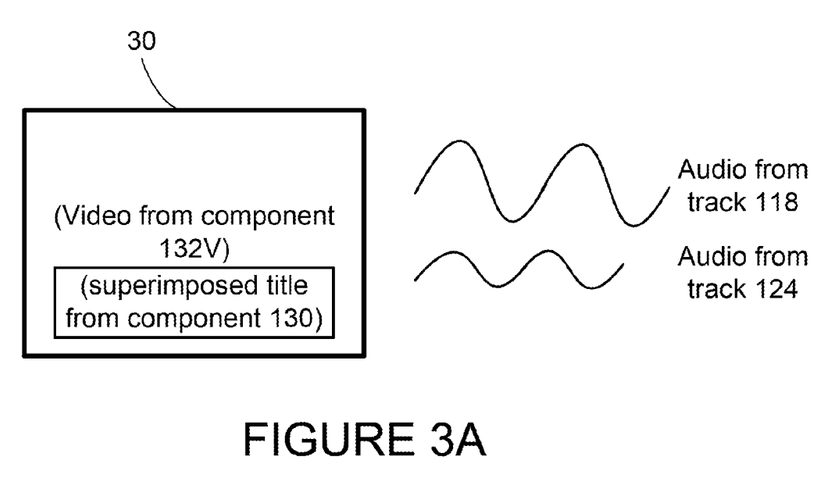
FIGS. 3A and 3B each show simplified example of mixed-down output of a composite media presentation.
Figure 3B:
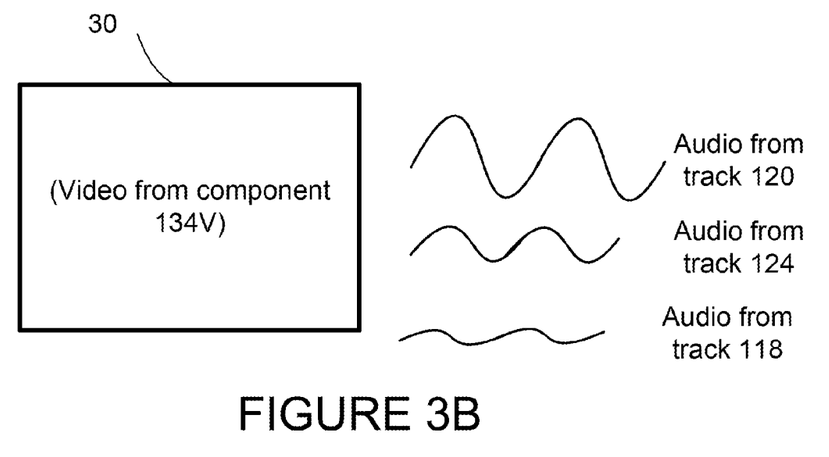

The following discussion relates to the editing interface 110 shown in FIG. 2 and further relates to examples of mixed-down output shown in FIGS. 3A-3B. The mixed-down output of FIGS. 3A-3B is provided by an output system 30, which may comprise a television, computer monitor, or other visual display device along with speakers and other components suitable for rendering audio output.

As shown by the waveforms of FIG. 2, audio levels for different components vary over the course of the composite media presentation. In example of FIG. 2, editing interface 110 displays audio waveforms so that vertical height of a waveform denotes its gain level. That is, the audio waveforms that are taller have a higher gain value. For instance, audio in track 118 (corresponding to audio for components 132-142) initially has a higher level as indicated by waveform 132G during time interval A. During that same time interval, audio component 148 has a relatively low volume level as shown by waveform 148G-1 (illustrated in time interval B, but in this example the level is the same for audio component 148 during time interval A).

The time interval over which a component is considered can affect the gain value (and the component's priority as a result). For example, a waveform can have a higher gain when measured over a time interval if it has more constant high levels than one that contains a mix of high and low gain levels during the time interval where the high levels are spikes of gain that are transient in nature.

FIG. 3A shows an example of the mixed-down output during time interval A. Namely, output system 30 provides video from component 132V in track 116 overlain by title from component 130 in track 114. The audio component of the composite media presentation is represented by the waveforms. Due to its higher gain, audio from track 118 is in the "foreground" (i.e. is the highest-priority track) while audio from track 124 is in the "background" (i.e. has a lower-priority). The audio in the foreground may be more readily perceived than audio in the background. This is represented by the larger size of the track 118 waveform in FIG. 3A.

During time intervals B and C, audio in track 118 (corresponding to components 134A and 136A) is adjusted to a lower gain level as shown by waveforms 134G and 136G in FIG. 2, while audio from component 144 in track 120 overlapping during that time interval is at a higher gain level as indicated by waveform 144G in FIG. 2.

For example, during time interval B, voiceover audio from component 144 may be the intended output for the mixed-down version of the composite media presentation. However, as was noted above, video from components 134V (followed by 138V) may be the desired visual output.

FIG. 3B shows an example of the mixed-down output during an initial portion of time interval B. Namely, output system 30 provides video from component 134V in track 116. The audio component of the composite media presentation is again represented by the waveforms. However, during this time interval, audio from track 118 is no longer in the foreground. Instead, audio from voiceover track 120 has the highest gain, while audio from music track 124 is in the background. In this example, audio from track 118 has the lowest magnitude and may be indiscernible even if present. Alternatively, audio from track 118 may be muted.

Although video components without sound could be included on track 116, this may not always be an option and is not the case in the example of FIGS. 2-3. Instead, video components 134V and 136V have accompanying audio components 134A and 136A. For example, video components 132V, 134V, 136V, and the like may have been recorded or otherwise captured along with respective audio components. The respective audio component 132A of video component 132V is in fact used during time interval A.

Removal of the linked audio components may not be an option if use of the corresponding video components is a desired goal. For instance, in certain nonlinear editing tools, the original source files are not altered during editing. For example, video components 134V and 136V may represent clips with accompanying audio accessed from one or more data stores 20 or 22 as noted above. The source clips may not be alterable by a user creating a composite media presentation using parts of the clips. Additionally, even if a clip has no associated audio component, previously-generated transcript metadata may nonetheless remain embedded in the clip, which could affect later presentations incorporating the clip.

Additionally, in practice, audio recorded in synch with "b-roll" or other footage (clips 134V, 136V, 138V, etc. of this example) is almost always included in a composite media presentation. The synched audio can be mixed to a low level so that it does not interfere with the priority audio track but is still discernible. This is sometimes called "nat sound" (natural sound) or background audio. Including low levels of nat sound is favored for many types of productions since it makes b-rolls seem more realistic. Otherwise, a composite media presentation featuring b-roll clips that are totally silent (i.e. with only the voiceover track audible) could resemble a narrated slide show.

In many cases, rather than removing an undesired audio component, an editor dials down the gain for an undesired audio component to near zero while increasing the gain for audio from one or more other components overlapping with the undesired component. In the mixed-down output, the desired audio component(s) will effectively drown out most or all of the undesired audio component(s) as in the example above.

Although adjusting gain for audio components can provide certain advantages in editing workflow, certain issues are introduced. For instance, when a composite media presentation is provided, metadata for the composite presentation may also be provided. Depending on the particular format of the composite media presentation, the metadata may describe the composite media presentation as a whole (e.g. file format, duration, etc.) and/or may include data about the components of the composite media presentation.

One example of metadata that may be provided is transcript metadata. Transcript metadata can comprise one or more textual representations of the audio content of a composite media presentation or a component thereof. For instance, the text may represent a series of words spoken, sung, or otherwise communicated. As another example, the text may describe a sound effect or music included in the audio.

In some instances, a component of a composite media presentation may include metadata comprising transcript metadata. For example, an audio or audiovisual component may have been subjected to a manual or automatic speech-to-text conversion process to generate transcript metadata that is included in or is associated with the component.

Returning to FIG. 2, several examples of transcript metadata are illustrated with a "T" suffix to the reference numeral. In this example, editing interface 110 includes a display of some or all of the transcript metadata associated with each component. Particularly, as shown at 132T-148T, transcript metadata is indicated as follows:

| Reference | Component | Transcript Metadata |
|---|---|---|
| 132T | Audio component 132A (track 118) | Welcome to "the Living Desert" |
| 134T | Audio component 134A (track 118) | "How does he react to visitors? He loves to watch . . . " |
| 136T | Audio component 136A (track 118) | "Usually, he is really quiet; I'll see if I can . . . " |
| 138T | Audio component 138A (track 118) | " . . . many animals does the hospital care . . . " |
| 140T | Audio component 140A (track 118) | " . . . they protect each other . . . " |
| 142T | Audio component 142A (track 118) | "We'll be right back, so stay tuned!" |
| 144T | Audio component 144 (track 120) | "Today, we'll go behind the scenes to see the animals up close . . . " |
| 146T | Audio component 146 (track 122) | "SFX: applause" |
| 148T | Audio component 148 (track 124) | Music: "African Sunset" |

In this example, transcript metadata 134T, 136T, 138T, and 140T indicate incomplete dialog. In this example, the b-roll clips comprising the audio were edited with regard to their video content and not their audio content since the editor knew this audio would be mixed down to a low level underneath the priority audio track. Thus, at this point in the composite media presentation, these clips are cut off before the respective speakers complete their dialog.

During time interval A, audio component 132A, corresponding to audio associated with video component 132V, is intended to be the highest-priority audio during the composite media presentation. Audio component 148, corresponding to theme or other music, is in the background. During time interval B, audio component 144, corresponding to a voiceover component, is intended to be the highest-priority audio, while audio components 134A, 136A, and 148 (corresponding to b-roll nat sound and music) are in the background.

During time interval C, the music of audio component 148 is intended to be the highest-priority audio, while audio components 138A and 140A (corresponding to b-roll nat sound) are in the background.

During time interval D, audio component 142A (corresponding to audio synched with video component 142V) is intended to be the highest priority audio. Audio component 148 (corresponding to music) is in the background.

In this example, several overlapping components can be observed during time interval B. Namely, audio component 134A overlaps audio components 144 and 148 during the initial portion of time interval B and audio components 136A, 144, 146, and 148 overlap during the latter portion of time interval B.

If transcript metadata from each overlapping component is simply imported or transferred when providing transcript metadata for the composite media presentation, the resulting transcript may be confusing. Namely, during the initial portion of time interval B, for example, transcript metadata 134T, 144T and 148T may be provided at once. During the latter portion, transcript metadata 136T, 144T, 146T, and 148T may all be provided at once. This may be especially confusing for transcript metadata 134T, 136T, and 144T, which each represent dialogue. For instance, if the transcript metadata is used to generate closed-captioned or subtitled displays, it may be unclear that the voiceover of component 144 is the intended component for attention.

Audio Gain is a nondestructive effect applied to clips used in a sequence, and doesn't affect metadata stored in the source files, such as speech transcript metadata. However, problems may arise even if transcript metadata for components is generated at the time a composite media presentation is put together. For instance, although gain may be set very low for a particular component during a time interval, the audio from that component may be converted into transcript metadata. Automatic Speech transcription may ignore any applied effects such as audio gain and produce text based on the quality of the original source file's audio signal.

Figure 4:
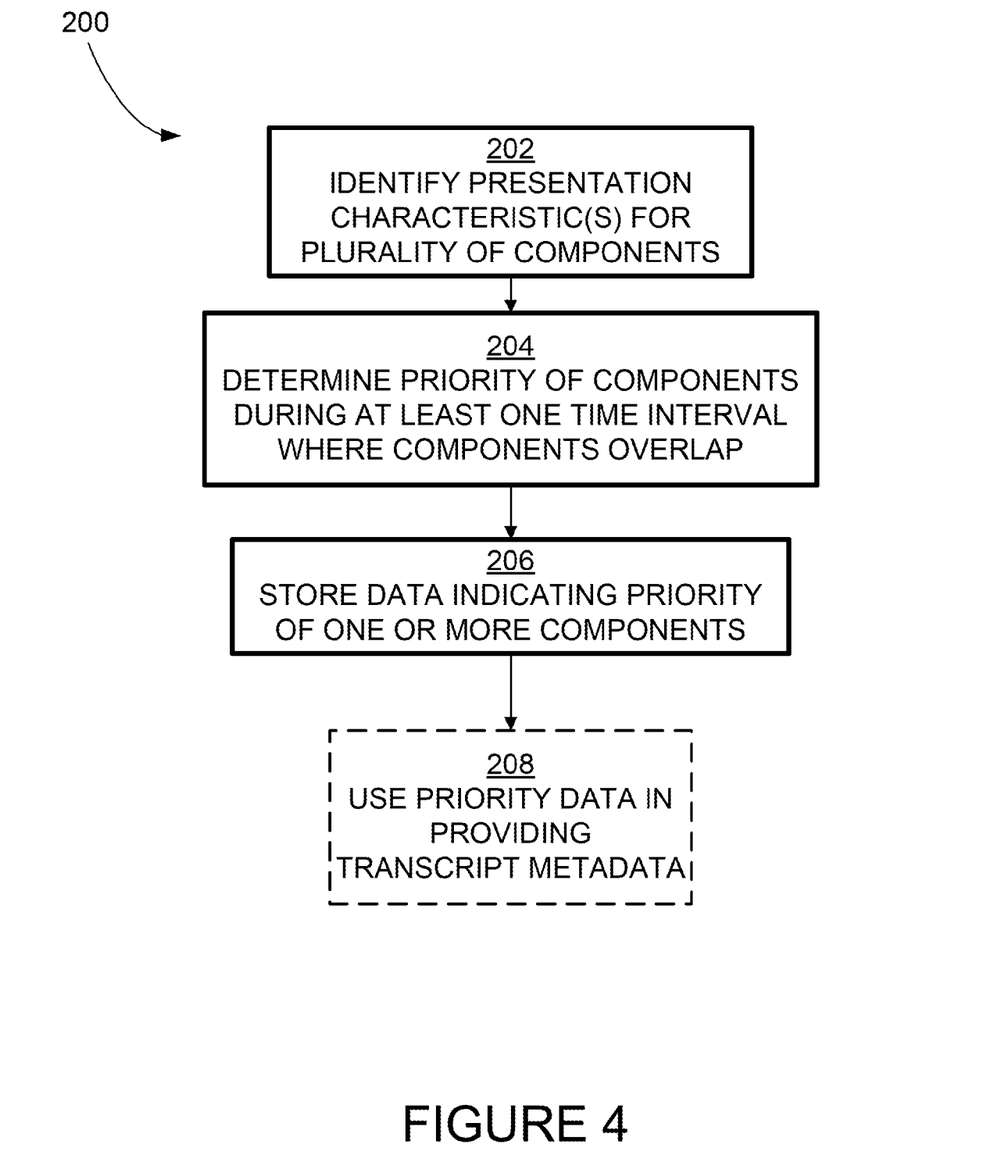
FIG. 4 is a flowchart illustrating steps in an exemplary method of prioritizing metadata based on presentation characteristics.

To mitigate the issue of how to use transcript metadata from multiple components, one or more methods in accordance with the present subject matter can be practiced when transcript metadata for a composite media presentation is to be provided. For example, FIG. 4 illustrates an embodiment of a method 200 for prioritizing transcript metadata.

Block 202 represents identifying or more presentation characteristics for each of a plurality of components of a composite media presentation. At block 204, priority of one or more of the components is determined during at least one time interval during which the components overlap, with priority determined based on the presentation characteristic(s) that were identified. Block 206 represents storing data indicating the relative priority of at least one component.

For example, the presentation characteristics can comprise the audio gain or other suitable indicator of whether the component is intended to be the primary point of attention during a given time interval. Returning to the examples associated with FIG. 2 above, during the initial portion of time interval B, three audio components 40, 42, and 36 overlap. The presentation characteristic could comprise gain. In this example, component 42 has the highest gain, followed by component 36 and then 40. Thus, during the initial portion of time interval B, component 40 would have the highest priority in this example.

Determining the priority of one or more components can vary. For example, in some implementations, the component having the highest priority during a time interval is identified and data indicating that component is stored without noting the priority of the remaining components. In some embodiments, priority data for multiple components overlapping during the time interval is stored. For example, component 42 could be indicated as having the highest priority during the time interval, with the relative priorities of components 36 and 40 also indicated.

Priority data can be stored in any suitable form and can vary according to factors including the storage format for the composite media presentation and/or how transcript metadata will be provided. For example, a numerical priority for a particular track or component may be indicated when multiple priorities for a given time interval are stored in the metadata. As another example, a table may be maintained indicating which component has the highest priority during a given time interval of the composite media presentation. As yet another example, a table may be maintained indicating which components overlap during particular time intervals of the composite media presentation. For each time interval, the priority data for transcript metadata for respective components can be included.

Block 208 represents using the priority data when providing transcript metadata. It should be understood that block 208 can occur shortly after block 206 or may occur at a much later time depending on how transcript metadata is provided.

Figure 5:
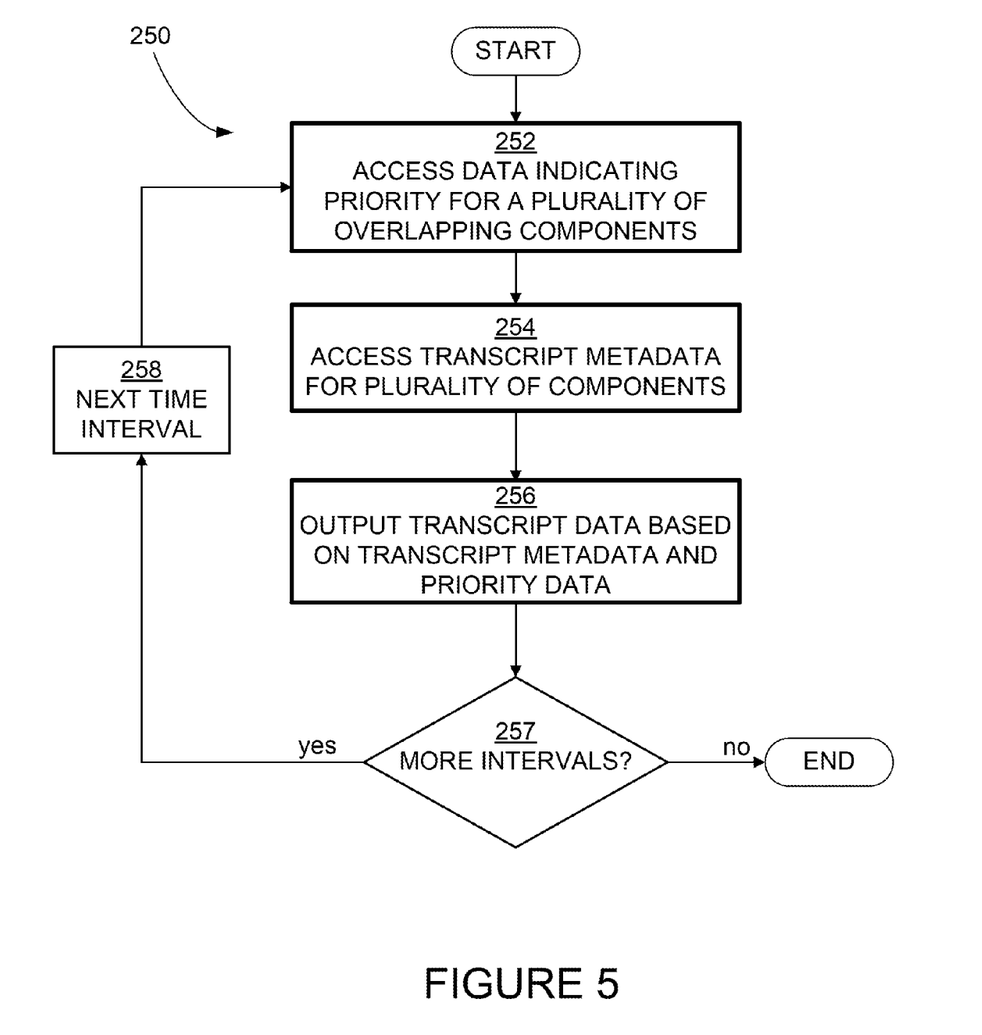
FIG. 5 is a flowchart illustrating steps in an exemplary method of providing transcript metadata based on data indicating priority of components.

FIG. 5 is a flowchart illustrating an exemplary method 250 for using priority data to provide transcript metadata. A method in accordance with exemplary method 250 may be used, for example, to generate transcript metadata to be associated with a composite media presentation. Thus, method 250 may be executed by editing software as part of generating a composite media presentation. However, as another example, such a method may be used at playback time to provide transcript metadata alongside the composite media presentation. Thus, a variant of method 250 could be carried out by a playback device or software component.

Method 250 addresses how time intervals having overlapping components are handled. Although not discussed in detail, the method can be adjusted accordingly to address time intervals having a single component. For instance, if only one component is present at a particular time interval, then by default that component can have the "highest" priority during that time interval and that component can be used as the source of transcript metadata.

Turning to FIG. 5, block 252 represents accessing data indicating relative priority for a plurality of overlapping components during a given time interval. As was noted above, depending on the implementation, each component may have an associated priority level or only the highest-priority component may be indicated. It should be noted that, in some implementations, the priority data may not be determined before method 250 is carried out. Instead, accessing data indicating the priority may be based on first accessing the audio gain or other characteristics of a plurality of overlapping components and then determining the relative priority of components during that time interval.

At block 254, transcript metadata can be accessed for the overlapping components during the time interval. It should be noted that in some embodiments block 254 may also represent generating transcript metadata if none is available. For instance, if the audio components are maintained separately or are otherwise discernable, then speech-to-text processing may be performed to obtain transcript metadata for the components. However, in other embodiments, transcript metadata for the plurality of components may have been generated previously as was noted above.

At block 256, transcript data for the composite media presentation is output based on the transcript metadata and the priority data. For instance, if method 250 represents generating a transcript for later use, the transcript data for that time interval may be stored in a computer-readable medium. If method 250 represents outputting transcript data alongside the composite media presentation, then block 256 can comprise rendering text or other effects based on the transcript data. For example, closed-captioning, subtitles, icons, or other indicators may be generated on screen based on the transcript metadata. The particular manner in which the transcript is output or stored can depend on the priority of the particular component(s) used as the source for the transcript data.

As one example, only the transcript metadata from the component having the highest priority during the time interval is used for output. As another example, transcript metadata from multiple components can be output or stored but with different output characteristics or storage annotations based on relative priority.

Block 257 represents looping to the next time interval (if any) via block 258. If no further time intervals remain, then method 250 ends.

As was noted above, in some embodiments, providing transcript metadata comprises generating a transcript for the composite media presentation. This may occur when, for instance, the mixed-down version of the composite media presentation is to be output as a single media stream without separately preserving data identifying the component source of metadata associated with the composite media presentation. In some such embodiments, for each segment of the composite media presentation, transcript metadata for a particular segment of the composite media presentation is selected from the one of the plurality of overlapping components whose audio has the highest priority as indicated by the priority data for the segment.

In some embodiments, providing transcript metadata may comprise accessing metadata associated with particular components and then outputting transcript data based on the accessed component metadata. For instance, the mixed-down version of the composite media presentation may be maintained in a "metadata-rich" form that preserves the relative source of component metadata. In such embodiments, the priority data could be used to access metadata associated with higher-priority components "on the fly" as the composite media presentation is output.

Still further, the priority data may not be maintained with the composite media presentation, but may be determined at the time that the transcript metadata is output. For example, the gain levels of various components could be evaluated at playback time to determine which component(s) are to be the source for transcript metadata during playback.

Other examples example of a "metadata-rich" format may use a transcript comprising text from multiple components for a given time interval. For instance, the transcript at a given time interval may include transcript data sourced from all overlapping components during the time interval. However, the priority data may be provided on a word-by-word basis. As an example, the transcript may comprise a list of words and time markers. Each word/time marker entry may further be associated with priority data such as a numerical ranking or a gain level for that word. Transcript data can be provided based on the transcript metadata as filtered for particular priority levels.

Use of metadata-rich formats may allow for the transcript for a composite media presentation to change. For instance, if the separate identities of components of the composite media presentation are maintained, the relative gain values or other aspects of the presentation may be changed by later edits. Such changes can be reflected in the priority data so that the proper transcript metadata is provided when the subsequently-edited presentation is output.

It should be noted that, when providing transcript metadata for output, text associated with multiple components may be provided. For example, returning to FIG. 2, during time interval A, text corresponding to transcript metadata 62A and 62F may be output simultaneously. Priority data may be used to determine factors such as screen position, font, and other characteristics. For instance, text based on transcript metadata 62A may be displayed more prominently (e.g., in a larger font in the bottom center of the screen) while text based on transcript metadata 62F may be displayed elsewhere (e.g. in a small font in a corner of the screen).

In several of the examples above, an audio gain value is the presentation characteristic used to prioritize transcript metadata. Gain value can be determined in any suitable manner. For example, waveform analysis may be used to evaluate the audio signals of overlapping components during a given time interval, provided the components are maintained as separate tracks or are otherwise discernable. As another example, gain-related settings may be accessed; this may be a particularly effective implementation when the present subject matter is implemented as part of an editor.

Particularly, gain over a specified period of time (e.g., 50 milliseconds) can be used to ensure that transient spikes in volume do not affect the prioritization. The time period may be a user-specified parameter. Any suitable measure of gain over time could be used, including, but not limited to, the gain as averaged over time or a Root Mean Square (RMS) value.

Other user settings can indicate how priority is to be determined. For example, since the placement, duration, and gain of clips after the current playhead position is always known, intelligent decisions can be made when more than one clip contains the same relative gain at a given point. For example, a first clip may "win out" over a second clip having the same gain level if the first clip has a longer duration, with the duration being a user-specified parameter.

Another user-specified setting can indicate the amount of gain differential that determines priority (e.g., +10 db, +15 db, etc.) and this setting could be used to adjust "sensitivity" for purposes of determining priority.

As mentioned earlier, frequency analysis could be used in determining priority. For example, frequency-based filtering can be used to isolate spoken words (e.g., male human voice vs. female voice) over other types of sounds in different frequency ranges. Gain levels could be "weighted" based on frequency measurements (also referred to as A-weighting) before comparing gain levels (or differentials) to determine priority.

Several examples above related to providing transcript metadata as part of a composite media presentation. However, priority data indicated in transcript metadata can be leveraged in numerous ways. For example, priority data can be considered in searching a set of content using a query comprising a word or phrase of interest. For instance, in some embodiments, a method can comprise receiving a query for searching a set of audio or audiovisual media presentations and searching transcript metadata associated with the presentations for the word or phrase of interest.

As an example, each content item may have transcript metadata that includes (for at least some words) an indication of the priority of an audio component from which the word was derived. As mentioned above, the indication of priority may comprise a gain level. However, the indication of priority could be a rank or other indicator.

In any event, the method can comprise providing a search result based on the search, with the search result indicating a content item or items associated with transcript metadata that includes words matching the query. A "match" need not be exact—for example, the search could support approximate matches to handle variants in spelling, word order, use of synonyms, etc.

The query may identify a priority of interest and searching comprises searching words of the transcript metadata indicated as having the priority of interest. For example, only the words associated with audio having the highest priority could be searched. As another example, only words associated with audio having a priority other than the highest priority could be searched.

The search method could be executed by a software module, process, or component included in a presentation authoring tool (e.g., a nonlinear editing tool). However, the search method could be used in another application such as a transcript viewer. As a further example, the search method could be implemented by a search engine comprising one or more computing devices with access to the transcript metadata. In some embodiments, the search engine could return indicators (e.g., URLs or network addresses) for viewing or listening to content having words matching the search results.

Figure 6:
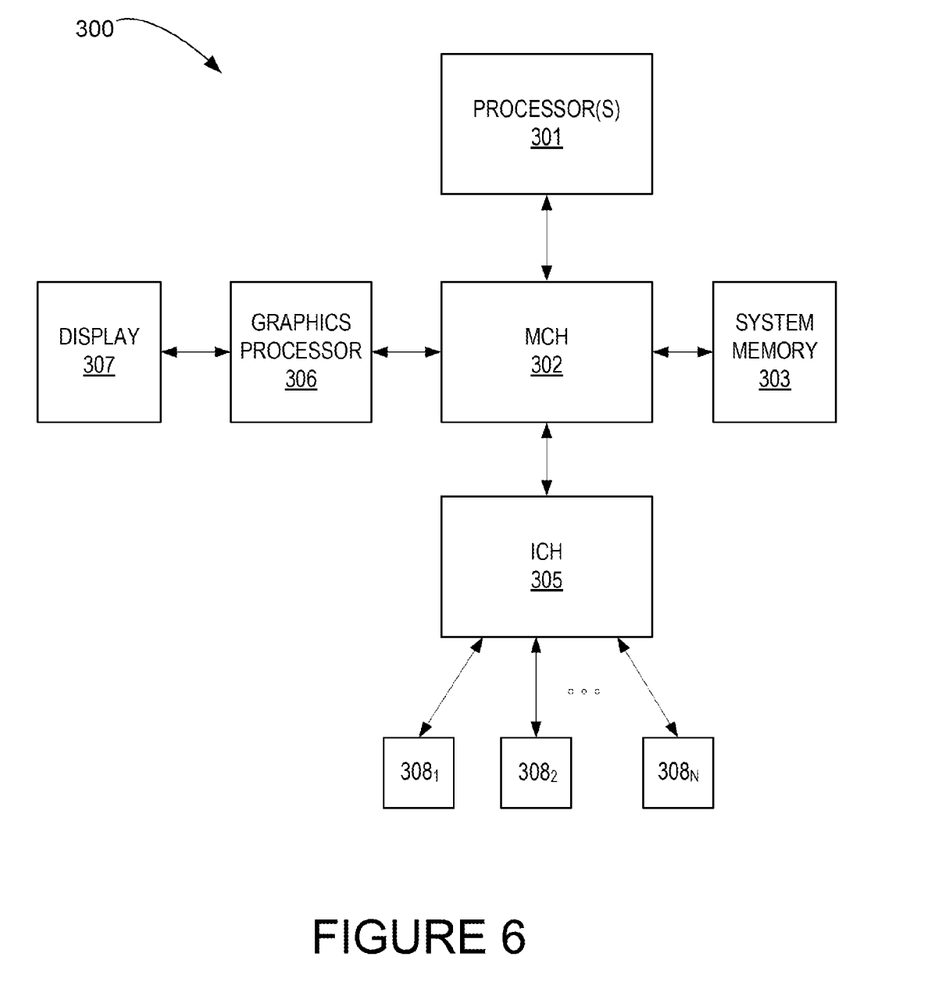
FIG. 6 is a block diagram depicting an example of a computing device suitable for implementing embodiments of the present subject matter.

FIG. 6 illustrates an example of computing device 300 suitable for implementing a composite media presentation editing tool or rendering a composite media presentation as described in the examples above. The exemplary computing system of FIG. 6 includes: 1) one or more processors 301; 2) a memory control hub (MCH) 302; 3) a system memory 303 (of which different types exist such as DDR RAM, EDO RAM, etc,); 4) a cache 304; 5) an I/O control hub (ICH) 305; 6) a graphics processor 306; 7) a display/screen 307 (of which different types exist such as Cathode Ray Tube (CRT), Thin Film Transistor (TFT), Liquid Crystal Display (LCD), DPL, etc.); and/or 8) one or more I/O devices 308.

The one or more processors 301 execute instructions in order to perform whatever software routines the computing system implements. The instructions frequently involve some sort of operation performed upon data. Both data and instructions are stored in system memory 303 and cache 304. Cache 304 is typically designed to have shorter latency times than system memory 303. For example, cache 304 might be integrated onto the same silicon chip(s) as the processor(s) and/or constructed with faster SRAM cells whilst system memory 303 might be constructed with slower DRAM cells. By tending to store more frequently used instructions and data in the cache 304 as opposed to the system memory 303, the overall performance efficiency of the computing system improves.

System memory 303 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 303 prior to their being operated upon by the one or more processor(s) 301 in the implementation of a software program. Similarly, data that a software program determines should be sent from the computing system to an outside entity through one of the computing system interfaces, or stored into an internal storage element, is often temporarily queued in system memory 303 prior to its being transmitted or stored.

The ICH 305 is responsible for ensuring that such data is properly passed between the system memory 303 and its appropriate corresponding computing system interface (and internal storage device if the computing system is so designed). The MCH 302 is responsible for managing the various contending requests for system memory 303 access amongst the processor(s) 301, interfaces and internal storage elements that may proximately arise in time with respect to one another.

One or more I/O devices 308 are also implemented in a typical computing system. I/O devices generally are responsible for transferring data to and/or from the computing system (e.g., a networking adapter); or, for large scale non-volatile storage within the computing system (e.g., hard disk drive). ICH 305 has bi-directional point-to-point links between itself and the observed I/O devices 308.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, but also application-specific integrated circuits and other programmable logic, and combinations thereof. Any suitable programming, scripting, or other type of language or combinations of languages may be used to implement the teachings contained herein in software.

Embodiments of the methods disclosed herein may be executed by one or more suitable computing systems. Such system(s) may comprise one or more computing devices adapted or configured to perform one or more embodiments of the methods disclosed herein. The order of the blocks presented in the examples above can be varied—for example, blocks can be re-ordered, combined, and/or broken into sub-blocks. Certain blocks or processes can be performed in parallel.

As noted above, such devices may access one or more computer-readable media that embody computer-readable instructions which, when executed by at least one computer, cause the at least one computer to implement one or more embodiments of the methods of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, and portable music players. Computing devices may be integrated into other devices, e.g. "smart" appliances, automobiles, kiosks, and the like. Examples of media in which composite media presentations can be rendered include, but are not limited to, digital or analog video and audiovisual displays.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components, including communication over a network. It should be appreciated that such network communications may occur over any suitable number or type of networks, including, but not limited to, a dial-in network, a local area network (LAN), wide area network (WAN), public switched telephone network (PSTN), the Internet, an intranet or any combination of hard-wired and/or wireless communication links.

Any suitable computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices, and the like.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A computer-implemented method comprising:
   identifying, by a media application executed on a computing device, a presentation characteristic for a plurality of components overlapping during at least one time interval of a composite media presentation, the composite media presentation presented by the media application in a user interface of the media application, the presentation characteristic including an audio gain value based on presenting the composite media presentation in the user interface;

determining, by the media application, a priority of each of the plurality of components during at least one time interval based on a magnitude of at least the audio gain value included in the presentation characteristic;

storing, by the media application, the priority of each of the plurality of components in metadata associated with the media presentation for the at least one time interval;

associating, by the media application based on the metadata, the priority of each of the plurality of components with a transcript of the each of the plurality of components; and in response to receiving a query indicating a priority of interest, performing, by the media application, steps comprising:

searching transcripts of the plurality of components based on word matching and priority matching between the query and the transcripts, the word matching comprising identifying matches between the query and words included in the transcripts, the query matching comprising identifying matches between the priority of interest indicated in the query and priorities included in the metadata of the plurality of components;

selecting a transcript from the transcripts based on the searching, the transcript associated with a priority of a component of the plurality of components, the transcript selected based on (i) a match between the query and words included in the transcript and (ii) a match between the priority of interest indicated in the query and the priority of the component; and providing, based on the searching, a search result indicating the component of the media presentation.

2. The computer-implemented method set forth in claim 1, further comprising generating, by the media application, the transcripts, each transcript indicating the priority of a respective component for the at least one time interval.

3. The computer-implemented method set forth in claim 1, further comprising storing, by the media application, the composite media presentation in a format for output and including the transcripts, the transcripts indicating the priority of each of the components for at least one time interval.

4. The computer-implemented method set forth in claim 1, wherein a priority of each of the plurality of components is determined for a plurality of time intervals.

5. The computer-implemented method set forth in claim 4, further comprising storing data indicating a change in priority for at least one component from one time interval to another time interval.

6. The computer-implemented method set forth in claim 4, further comprising:

providing, by the media application, a transcript for a plurality of time intervals of the composite media object based on the priority of each component during each time interval.

7. The computer-implemented method set forth in claim 6, wherein:

each component is associated with respective transcript data; and the transcript for each time interval of the composite media object is provided by accessing transcript data indicating the priority of the components during that time interval.

8. The computer-implemented method set forth in claim 1 wherein the presentation characteristic indicates the audio gain value of an audio component from which a word was derived.

9. The computer-implemented method set forth in claim 8, wherein the audio gain value is a differential gain value.

10. The computer-implemented method set forth in claim 8, wherein the audio gain value is determined based on a frequency component of audio corresponding to spoken words.

11. The computer implemented method set forth in claim 1, wherein the magnitude of the identified presentation characteristic is of the audio gain value, and wherein determining the priority of each of the plurality of components during at least one time interval is based at least in part on the magnitude of the audio gain value.

12. The computer implemented method set forth in claim 1, wherein the query includes the priority of interest, and wherein the transcript includes words derived from each of the plurality of components.

13. The computer implemented method set forth in claim 1, wherein each component is associated with respective metadata that stores words derived from the component and that stores a priority of the component, and wherein searching the transcripts comprises searching only respective metadata having the priority of interest.

14. The computer implemented method set forth in claim 1, wherein the search result includes the transcript, and wherein the transcript includes first words stored in the respective metadata of the component.

15. The computer implemented method set forth in claim 14, wherein the search result includes second transcript that includes second words of a second component having a second priority, wherein the first words in the transcript are formatted for presentation based on the priority of the component, and wherein the second words in the second transcript are formatted for presentation in conjunction with the first words based on the second priority of the second component.

16. A non-transitory computer-readable medium embodying program code executable by a computing device, the program code comprising:

program code, of a media application, for identifying a presentation characteristic for a plurality of components overlapping during at least one time interval of a composite media presentation, the composite media presentation presented by the media application in a user interface of the media application, the presentation characteristic including an audio gain value based on presenting the composite media presentation in the user interface;

program code, of the media application, for determining a priority of each of the plurality of components during at least one time interval based on a magnitude of at least the audio gain value included in the presentation characteristic;

program code, of the media application, for storing the priority of each of the plurality of components in metadata associated with the media presentation for the at least one time interval;

program code, of the media application, for associating, based on the metadata, the priority of each of the plurality of components with a transcript of the each of the plurality of components; and program code herein of the media application for performing steps, in response to receiving a query indicating a priority of interest, comprising:

searching transcripts of the plurality of components based on word matching and priority matching between the query and the transcripts, the word matching comprising identifying matches between the query and words included in the transcripts, the query matching comprising identifying matches between the priority of interest indicated in the query and priorities included in the metadata of the plurality of components;

selecting a transcript from the transcripts based on the searching, the transcript associated with a priority of a component of the plurality of components, the transcript selected based on (i) a match between the query and words included in the transcript and (ii) a match between the priority of interest indicated in the query and the priority of the component; and providing, based on the searching, a search result indicating the component of the media presentation.

17. A system comprising:

a processor for executing instructions stored in non-transitory computer-readable medium on one or more devices to perform operations of a media application, the operations comprising:

identifying, by the media application, a presentation characteristic for a plurality of components overlapping during at least one time interval of a composite media presentation, the composite media presentation presented by the media application in a user interface of the media application, the presentation characteristic including an audio gain value based on presenting the composite media presentation in the user interface;

determining, by the media application, a priority of each of the plurality of components during at least one time interval based on a magnitude of at least the audio gain value included in the presentation characteristic;

storing, by the media application, the priority of each of the plurality of components in metadata associated with the media presentation for the at least one time interval;

associating, by the media application and based on the metadata, the priority of each of the plurality of components with a transcript of the each of the plurality of components; and in response to receiving a query indicating a priority of interest, performing, by the media application, steps comprising:

searching transcripts of the plurality of components based on word matching and priority matching between the query and the transcripts, the word matching comprising identifying matches between the query and words included in the transcripts, the query matching comprising identifying matches between the priority of interest indicated in the query and priorities included in the metadata of the plurality of components;

selecting a transcript from the transcripts based on the searching, the transcript associated with a priority of a component of the plurality of components, the transcript selected based on (i) a match between the query and words included in the transcript and (ii) a match between the priority of interest indicated in the query and the priority of the component; and providing, based on the searching, a search result indicating the component of the media presentation.

* * * * *